Nov. 23, 1965

W. BRADY 3,219,797

HOT AIR TORCH

Filed Sept. 24, 1963

INVENTOR.
WILLIAM BRADY
BY
Van Valkenburg and Fields
ATTORNEYS

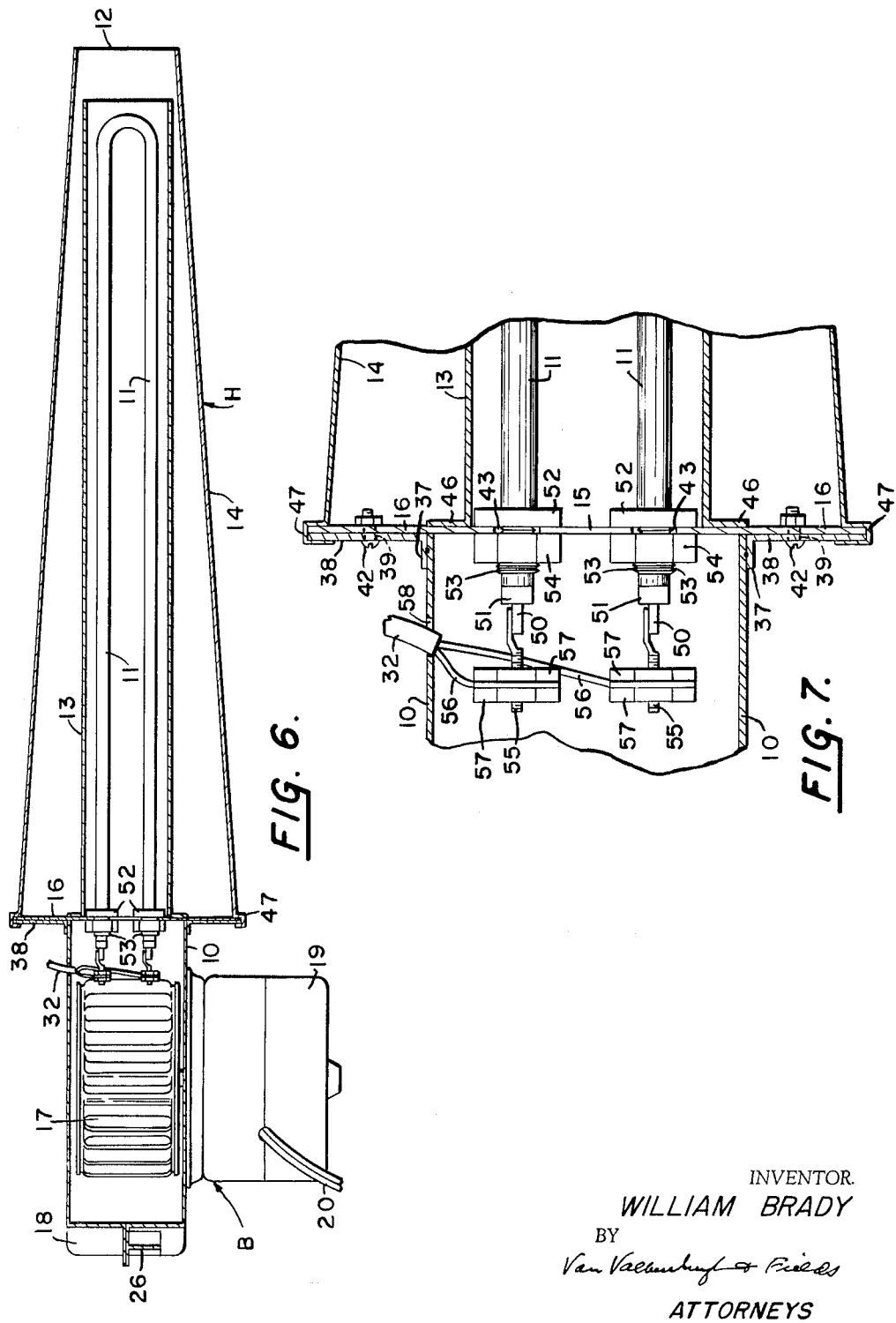

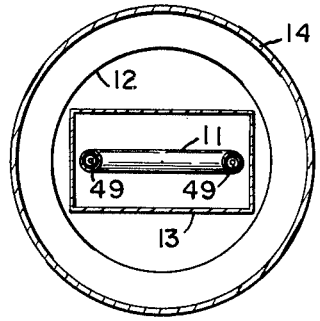
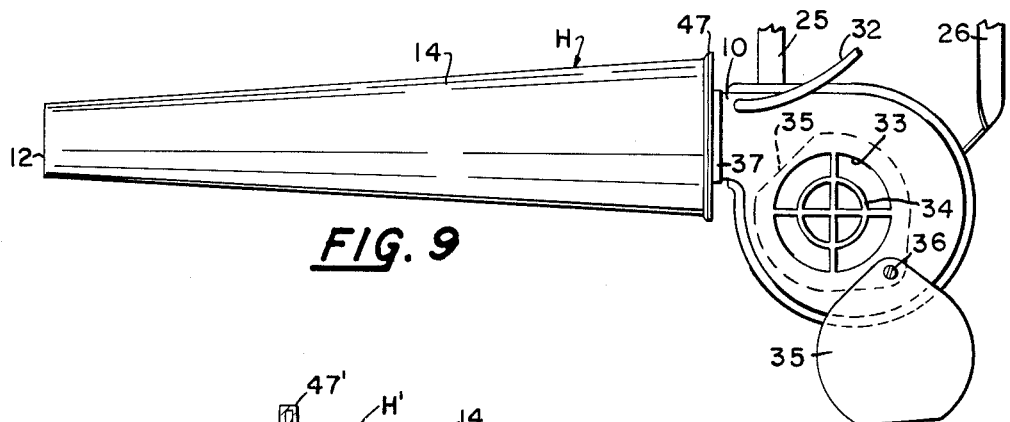
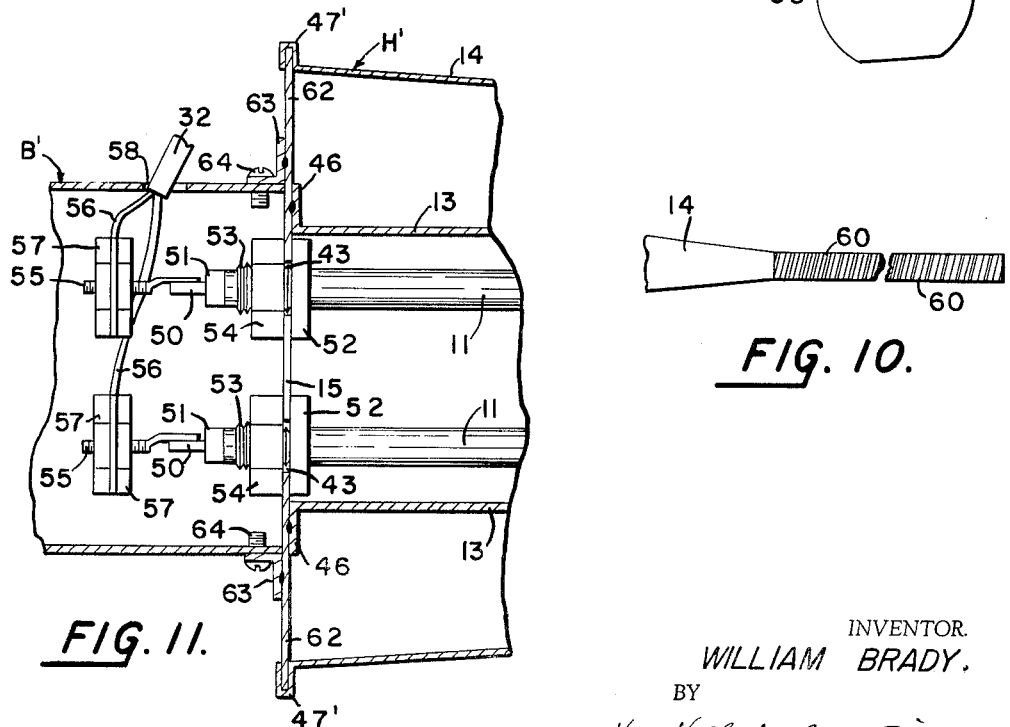
INVENTOR.
WILLIAM BRADY.

United States Patent Office 3,219,797
Patented Nov. 23, 1965

3,219,797
HOT AIR TORCH
William Brady, 2515 Spruce Drive, Loveland, Colo.
Filed Sept. 24, 1963, Ser. No. 311,139
1 Claim. (Cl. 219—370)

This invention relates to a hot air torch, and more particularly to a hot air torch for use in places where an open flame would be dangerous or impractical to use.

During the winter it is often desirable to have a device for keeping the engine of an automobile at a warmer temperature overnight than the surrounding air, so that the automobile will start easily in the morning, or a device for heating the engine prior to starting. One device provided for this purpose is a heater which is substituted for the oil level dipstick. However, such heaters have limitations, particularly in modern cars, in that the tube through which the dipstick extends is curved and the dipstick itself is flexible so as to follow the curve of the tube. Thus, it is virtually impossible to use a dipstick heater in this type of tube because the tube is usually straight at the upper end and curved at the bottom end. Since the heating of the dipstick heater is not flexible, it cannot be bent so as to easily slide in and out of the dipstick tube. Also, attempts have been made to keep the engine warm by placing a light bulb under the hood during the night, but in very cold weather, it is difficult for the light bulb to keep the engine sufficiently warm for quick starting.

During cold weather, the desirability of having a heat applying device which is convenient and easy to use is present in other areas, such as to thaw out gas lines, water pipes or hoses and for use on farms and ranches for warming or drying newborn calves and litters of newborn pigs. Furthermore, a portable, easy-to-use device for defrosting deep freeze units and refrigerators is desirable.

Among the objects of this invention are to provide a novel hot air torch; to provide such a hot air torch utilizing an electric heating unit and a blower for blowing air to be heated past the heating unit; to provide such a hot air torch in which the heating unit will more effectively heat the air; to provide such a hot air torch wherein the heating unit is mounted in a relatively simple manner; to provide such a hot air torch which is provided with a socket for a light bulb, mounted to provide effective lighting for the area or parts being heated; to provide such a hot air torch having a handle which may be provided by a conventional handle of an extension light; to provide such a hot air torch wherein the heating element is shielded from contact by the operator or the parts being heated; to provide such a hot air torch in which the amount of air is adjustable; to provide such a hot air torch having an insulating space around the air heating area; to provide such a hot air torch adapted to be provided with a flexible extension for directing heated air into places which would otherwise be difficult to reach; to provide such a hot air torch which is of simple construction; and to provide such a hot air torch which is easy to use and efficient in operation.

Additional objects and the novel features of this invention will become apparent from the description which follows, taken in conjunction with the accompanying drawings, in which:

FIG. 6 is a horizontal, longitudinal section, on an enlarged scale, taken along line 6—6 of FIG. 1, showing details of the heating assembly and blower;

FIG. 7 is a fragmentary section, comprising a portion of FIG. 5 on a further enlarged scale and showing particularly details of the electrical connections for the heating element;

FIG. 8 is a vertical section, on an enlarged scale, and taken along line 8—8 of FIG. 1, showing the interior of the heating assembly;

FIG. 9 is a fragmentary side elevation, similar to FIG. 1 but showing the opposite side of the hot air torch and particularly the intake opening to the blower;

FIG. 10 is a fragmentary, condensed, side elevation, on a reduced scale, showing the discharge end of the hot air torch and a flexible nozzle attached thereto; and FIG. 11 is a fragmentary, longitudinal section, similar to FIG. 7 but on a further enlarged scale and showing an alternative mounting arrangement.

Figure 1:
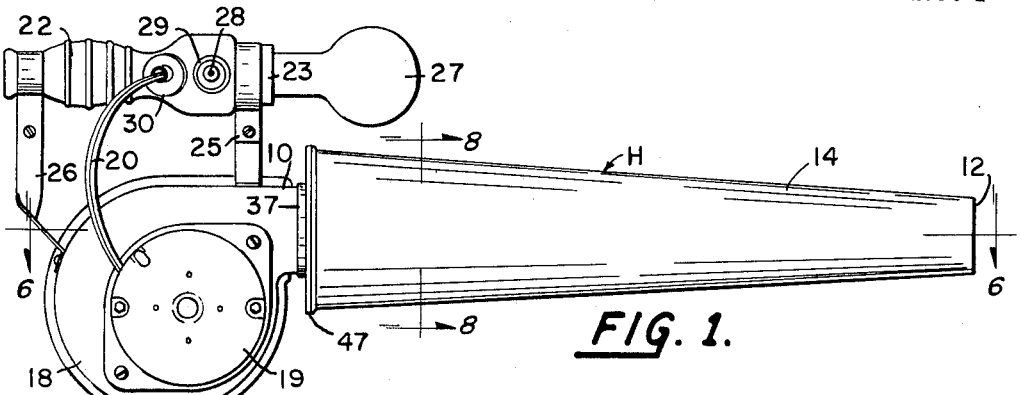
FIG. 1 is a side elevation of a hot air torch constructed in accordance with this invention.
Figure 2:
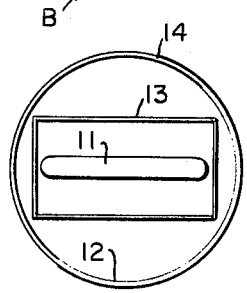
FIG. 2 is a front elevation, on an enlarged scale, of the front end of an air heating assembly of the hot air torch of FIG. 1.
Figure 4:
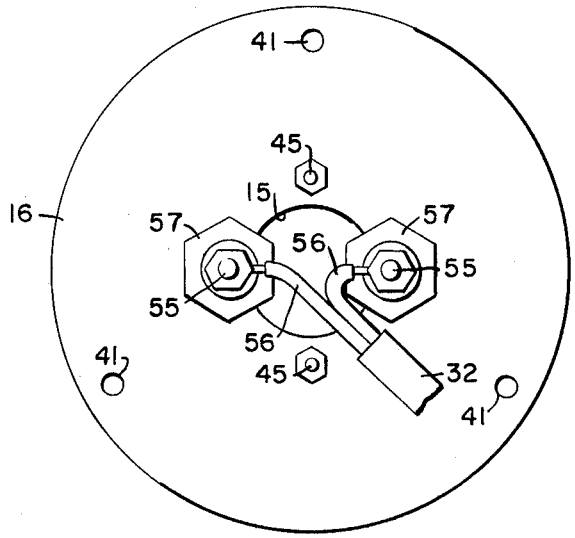
FIG. 4 is a rear end elevation, also on an enlarged scale, of a mounting plate of the air heating assembly, showing particularly the electrical connections of the heating element.

In accordance with this invention, a hot air torch, as in FIG. 1, comprises a heating assembly H attached to the air outlet 10 of a blower assembly B, adapted to blow air through the heating assembly and particularly past a generally U-shaped heating element 11, as in FIG. 6, for heating the air before it is discharged from the discharge end 12 of the heating assembly. Heating element 11 is disposed within an inner sleeve or conduit 13, which is conveniently generally rectangular in cross section to correspond generally to the lateral shape of the heating unit and insure that air blown along the heating element 11 will be heated to the desired temperature, such as up to 400° F. The outer end of conduit 13, as in FIG. 6, is spaced inwardly from the discharge end 12 of the heating assembly, with the outer end of heating element 11 preferably also spaced inwardly from the outer end of conduit 13. Conduit 13 is surrounded in spaced relation by a conveniently conical, outer sleeve or housing 14, which not only extends past inner sleeve 13 to discharge end 12, but is also spaced from inner conduit 13, as in FIGS. 2, 5 and 7, to provide an insulating air space around the inner conduit, as well as providing additional protection for the operator and preventing either the heating element 11 or the inner conduit 13 from undesirable contact with any person, material or parts. Thus, although heating element 11 must be heated to a higher temperature than the temperature to which the air is heated and inner conduit 13 will be heated by radiation, outer sleeve 14 provides protection against accidental contact with such heated parts. The effectiveness of the heating of the air is also increased by the turbulence produced by the passage of the air through a central orifice 15, as in FIG. 4, in a mounting plate 16 at the inner end of heating assembly H. Thus, the air blown by an impeller 17, mounted in a blower housing 18 and driven by a motor 19 supplied with electric current by an electrical cord 20, may be discharged through outlet 10 at a higher velocity than desired at discharge end 12 of the heating assembly, but the effectiveness of heating the air through the turbulence produced by passage through orifice 15 more than offsets the additional power required to drive impeller 17 to produce the air velocity desirable in outlet 10. The passage of the air through a rounded or circular orifice into the inner sleeve 13, of rectangular cross section, creates additional turbulence which assists in heating the air. Of course, by the time the air reaches discharge end 12, much of the turbulence is lost, but the heated air will tend to be discharged in a stream which corresponds generally to the shape of inner conduit 13.

Figure 3:
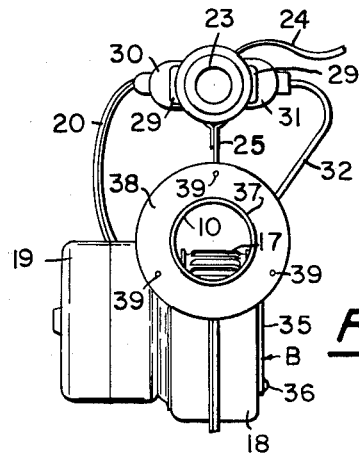
FIG. 3 is a front elevation of a blower and handle assembly of the hot air torch of FIG. 1, with a light bulb omitted for clarity of illustration.

A handle 22 is conveniently a conventional handle of an extension light, formed of molded rubber and of the type having a light socket 23 at one end and a drop cord 24, as in FIG. 3, extending from the other, which may be of any convenient length. Handle 22 is attached to the blower assembly by front and rear metal brackets 25 and 26, the former clamping socket 23 and being attached to blower housing 18 directly beneath, as by a screw, and the latter clamping the rear end of handle 22 and being attached to the rear edge of blower housing 18, as by a screw. Light socket 23 is adapted to receive a bulb 27, controlled by a switch 28 having a push button on opposite sides of the handle, each push button being protected by an outwardly extending rim 29, as in FIGS. 1 and 3. Handle 22 is also provided with a plug-in type socket on each side, spaced rearwardly from switch 28 and into which a plug 30 for motor cord 20 and a plug 31 for a cord 32 for the heating element, may be respectively inserted, as in FIG. 3.

Blower housing 18 is provided with an inlet opening 33, as in FIG. 9, in which is installed a grill 34 prevent a finger of the user or other object from contacting the impeller when it is running. Advantageously, the inlet opening 33 is provided with a cover plate 35 pivotally attached to the housing, as by a screw 36, so that it may be pivoted, as between the closed position shown in dotted lines and the open position shown in full lines. Thus, the amount of air drawn in and then discharged by the blower can be reduced by partially covering the inlet opening 33 with cover plate 35. Also, the cover plate, when closed as in FIG. 3, serves to prevent dirt or other foreign matter from entering the blower when not in use. The outlet 10 of the blower, as in FIGS. 3 and 9, is provided with a collar 37 having an outwardly extending flange 38, as in FIG. 3, to which the heating unit H is attached. Collar 37 may be attached to outlet 10 in any suitable manner, as by screws or spot welding, while flange 38 is provided with circumferentially spaced holes 39 for attachment of mounting plate 16 of the heating assembly, as described below.

Figure 5:
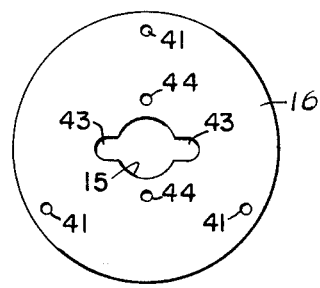
FIG. 5 is a rear elevation, on a smaller scale than FIG. 4, of the mounting plate alone.

The mounting plate 16 of the heating assembly H, as in FIG. 5 is provided with a series of circumferentially spaced holes 41, corresponding in position to holes 39 in flange 38 of FIG. 3, to receive screws 42, as in FIG. 7, for attachment of mounting plate 16 to flange 38. Mounting plate 16 is also provided with a pair of slots 43 extending outwardly in preferably diametrically opposed position from central orifice 15, for attachment of heating element 11, as described below; and also a plurality of holes 44, such as a pair, for attachment of inner conduit 13 by screws 45 of FIG. 4, screws 45 extending through the upper and lower pair of the out turned rear end flanges 46 of conduit 13. Conveniently, sleeve 14 is made of sheet metal and is attached to mounting plate 16 and flange 38 in any suitable manner, as by a rear flange 47 which abuts the front side of flange 38 and is rolled or crimped over and against the back side of flange 38, as in FIG. 7.

The heating element 11 is conveniently a conventional "Calrod" unit, having an outer tube surrounding a coil 49 of high resistance wire, as in FIG. 8, surrounded by packed, thermally conductive, insulating material and connected near each end of the heating element with a lead 50 of less resistance. Lead 50 extends through an insulator 51, as of ceramic, while a flange 52 and a threaded sleeve 53 are attached, as by brazing, near each end of the tube of the heating element. Sleeves 53 are placed in slots 43 of mounting plate 16, and nuts 54 tightened against the mounting plate and the respective flanges 52.

A threaded post 55 is attached, as by brazing, to each lead 50, for attachment of wires 56 of cord 32, as by nuts 57, while cord 32 extends through a hole 58 in blower outlet 10. As will be evident, wires 56 are conveniently attached to posts 55 before mounting plate 16 is attached to flange 38, after which housing 14 may be attached by flange 47.

When using the above hot air torch for heating, motor plug 30 may be disconnected but heater plug 31 connected until the heating element 11 reaches a suitable temperature, such as indicated by a cherry red glow thereof, whereupon motor plug 30 may be inserted in its socket. Then, the hot air can be directed toward the engine of an automobile or other item to be warmed so that the hot air is discharged thereagainst. The cool air is drawn in through inlet opennig 33 and is discharged from outlet 10, through orifice 15 in mounting plate 16, then through sleeve 13 past heating element 11, where it is heated to a high temperature, such as 400° F., to be discharged at the opposite end of housing 14. As will be evident, the hot air torch can be used to heat anything from frozen water pipes to newborn farm animals, to defrost refrigerators and deep freeze units, as well as other articles or objects. When heating animals, the blast of hot air is preferably not directed directly against them, but to one side or above.

In the event that the area to which the heated air is to be directed relatively inaccessible, a flexible metal tube 60, as in FIG. 10, may be attached to the end of housing 14, as by friction fit, and flexible tube 60 bent to a position in which the heated air can be directed to the desired area. Also, if the area to be heated is in darkness, bulb 27 of FIG. 1 may be lighted by pushing "on" switch 28.

A simplified construction of the mounting plate and associated parts is illustrated in FIG. 11, wherein the collar and flange on outlet 10 of blower assembly B is omitted, in the case of blower assembly B', which is otherwise similar to blower assembly B. Thus, outlet 10' thereof is provided with a hole 58 for heater cord 32, wires 56 of which are attached to posts 55 as before. Mounting plate 62 of FIG. 11 is provided with a central orifice 15 and slots 43 for attachment of the heating element, as described previously, while flanges 46 of inner sleeve 13 may be attached by spot welding, as shown, to the mounting plate, or by screws, as before. However, mounting plate 62 is provided on the rear side with a flanged collar 63, spot welded or otherwise suitably attached thereto, and in turn attached to outlet 10' by screws 64. A series of angular clips, at the positions of screws 64, may be substituted for collar 63. Housing 14 may be attached, at its rear end, to the outer edge of mounting plate 16 by a U-shaped flange 47', formed initially as an outwardly extending, angular flange, the rear edge of which is rolled or crimped over against the rear side of the mounting plate. Of course, any other suitable type of attachment, such as screws, brazing or spot welding, may be utilized. One advantage of the construction shown in FIG. 11, over that shown in FIG. 7, is that, with the former, the heating assembly may be completely assembled before attachment to the blower assembly, so that wires 56 may be connected to the heating element after completion of the heating assembly and just prior to attachment thereof to the blower assembly. Also, when housing 14 is connected to mounting plate 62 by flange 47', such connection is more easily made without the presence of the blower assembly.

From the foregoing, it will be evident that the objects and requirements hereinbefore set forth have been fulfilled to a marked degree. A novel hot air torch has been provided, which utilizes an electric heating unit for heating air discharged by a blower. Also, the hot air torch is provided with a light at the rear end of a discharge housing to facilitate observation of the area where the hot air is being blown. The handle is provided with a pair of sockets into which the motor and heater may be plugged for operation, while the use of a conventional extension light handle reduces the cost of the parts. The heating element is readily attached to the mounting plate, in slots which extend outwardly from an orifice which produces turbulence and thus more effective heating. The inner sleeve restricts the air flow to an area immediately adjacent the heating element and, when having a cross section different from the orifice, produces additional turbulence. The outer sleeve or housing provides an insulating air space around the inner sleeve, while a conical form of the outer housing increases visibility of the area to which the heated air is directed. The heating assembly is readily attached to the front end of the blower assembly, in the embodiment of FIGS. 1–8, by a mounting plate which is attached to a flange on the blower unit and by a flange on the housing, and in the embodiment of FIG. 9, by a mounting plate which is directly attached to the blower outlet. Thus, the hot air torch of this invention is of simple yet durable construction and is highly efficient in operation.

Although a preferred form of this invention and modifications thereof have been illustrated and described, it will be understood that various changes may be made and that other embodiments may exist, without departing from the spirit and scope of this invention.

What is claimed is:

A manually-handled hot air torch adapted to provide a jet of warm air and comprising the combination with a motor driven blower having a handle, an intake, a discharge passageway adapted to direct a flow of air therefrom and a circular mounting flange at the end of the discharge passageway:

(a) a transversely-disposed, circular mounting plate removably affixed to the mounting flange of said blower, said plate having a central orifice therethrough and mounting slots at opposite sides of the orifice;

(b) an elongated, U-shaped heating element, narrower in one transverse direction than the other, having the rear ends of its legs fitted in said mounting slots of said plate and attached to said plate to outstand forwardly from said plate, with the plate orifice between the legs of said element and with the legs of said element thereby being closely adjacent to the orifice;

(c) a substantially rectangular sleeve corresponding in shape and position to and encompassing said heating element and having its inner end secured to said mounting plate to outstand forwardly therefrom and define a hot-air generating passageway about said heating element, with the mounting plate orifice being within said sleeve and with the front end of said sleeve extending a short distance beyond the end of the heating element;

(d) an elongated, frusto-conical housing surrounding but spaced from said sleeve and having its larger, inner end secured to the peripheral edge of said mounting plate and its smaller, front end extending a short distance forwardly beyond the end of said sleeve; and (e) electrical connection means for supplying current to said blower motor and supplying current to the heating element by connection to the inner ends thereof.

References Cited by the Examiner
UNITED STATES PATENTS

| | | | |
|---|---|---|---|
| 981,641 | 1/1911 | Halliwell | 219—374 X |
| 1,777,744 | 10/1930 | Breuer | 219—373 |
| 1,869,737 | 8/1932 | Breuer | 219—273 |
| 2,021,955 | 11/1935 | Carswell et al. | 219—379 |
| 2,049,812 | 8/1936 | Loacker | 219—369 X |
| 2,114,494 | 4/1938 | Hummel et al. | 219—370 X |
| 2,209,086 | 7/1940 | Johnson. | |
| 2,470,181 | 5/1949 | McIntyre | 219—370 X |
| 2,658,798 | 11/1953 | Meltzer et al. | 34—243 X |

RICHARD M. WOOD, *Primary Examiner.*

ANTHONY BARTIS, *Examiner.*